United States Patent Office 3,289,713
Patented Dec. 6, 1966

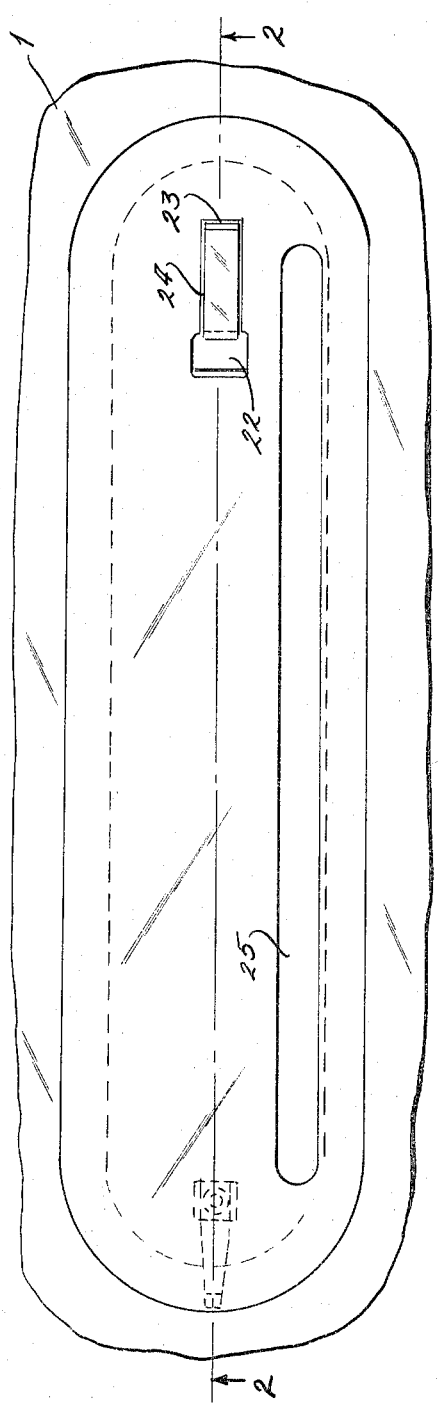
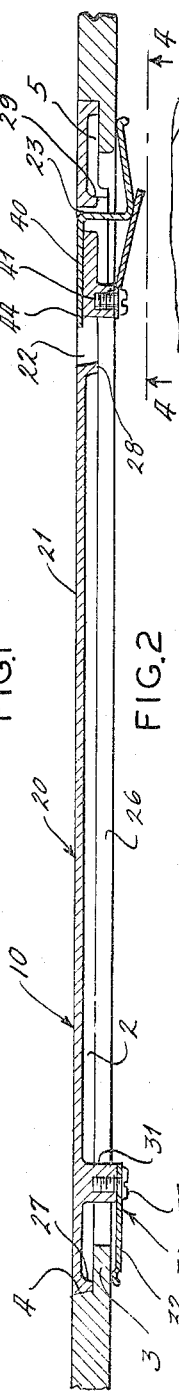
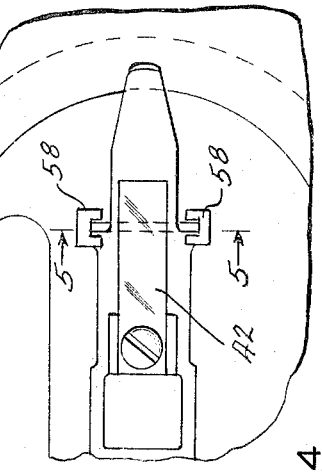
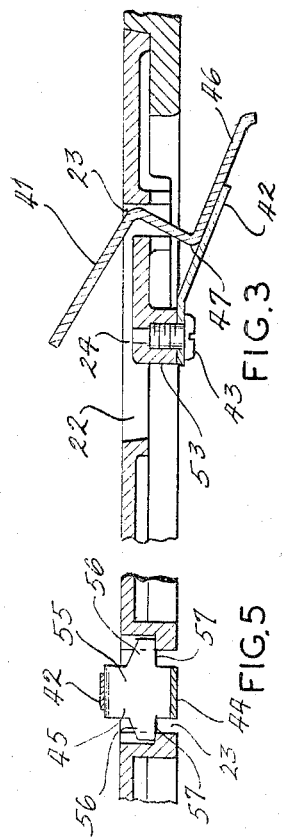

3,289,713
MACHINERY TABLE INSERT
Leroy L. Herzog, Belleville, Ill., assignor to Emerson Electric Co., St. Louis, Mo., a corporation of Missouri
Filed Oct. 26, 1964, Ser. No. 406,496
7 Claims. (Cl. 143—132)

This invention relates to tables for machinery such as circular saws and the like.

In such machinery as circular (bench) saws it is common to provide a flush-mounted insert in the bench or table top to cover an access hole through the top. In the past it has been customary to rely upon the weight of a relatively heavy die-cast insert to hold the insert in place, or to provide spring pressure clips which required the use of a tool to manipulate the insert or to use machine screws, which required the use of a screw driver for mounting and demounting the insert.

One of the objects of this invention is to provide a flush-mounted insert in a saw table or the like, which can easily be mounted and demounted without the use of tools.

Another object is to provide such an insert which is secure against accidental dislodgment Still another object is to provide such an insert which is inexpensive to manufacture, safe to use, durable and dependable.

Other objects will become apparent to those skilled in the art in the light of the following description and accompanying drawing.

In accordance with this invention, generally stated, a table insert is provided which is mounted on a table in such a way that by lifting a finger tab of a latch, the insert can be mounted on and demounted from the table.

In the preferred embodiment, the latch is provided at only one end of an elongated insert, while, for simplicity, the other end is held by a fixed clamp.

The latch comprises a spring biased dog leg clamping member with a finger lift tab exposed along the upper side of the plate, a central pivot-stop section which extends through a passage in the plate, and a clamp leg beneath the plate. Pivot means on the plate and the pivot-stop section of the dog leg clamping means cooperate to provide a fulcrum about which the free end of the clamp leg moves away from the underside of the plate when the free end of the finger tab is lifted. Biasing means are provided which normally biases the clamp leg toward the underside of the plate.

In the preferred embodiment described, the biasing means is a leaf spring mounted at one end on the underside of the plate and bearing, at its other end, on a curved section between and joining the clamp leg and the pivot-stop section of the dog leg clamping member.

Also in the preferred embodiment, the pivot means includes a pair of pivot bosses, one on each side of the opening through the plate through which the pivot-stop section of the dog leg clamping member extends, and the pivot-stop section includes a pair of oppositely extending wings, defining shoulders which are seated in seats in the pivot bosses.

In the drawing, FIGURE 1 is a fragmentary top plan view of a table top on which one illustrative embodiment of insert of this invention is mounted;

FIGURE 2 is a sectional view taken along the line 2—2 of FIGURE 1;

FIGURE 3 is an enlarged fragmentary sectional view, of the latch member shown in FIGURE 2, but in insert-release position;

FIGURE 4 is a bottom plan view in the direction and over the area indicated by the line 4—4 of FIGURE 2; and FIGURE 5 is a sectional view taken along the line 5—5 of FIGURE 4.

Referring now to the drawing for one illustrative embodiment of this invention, reference numeral 1 indicates a table top for a circular saw. The table top 1 has an access opening 2 defined around its lower part by an inwardly projecting flange 3. Above the flange 3 the opening 2 is defined by a vertical edge wall 4. Between the inner edge of the flange 3 and the edge wall 4, the top of the flange 3 forms a ledge 5.

An insert 10 is shaped to fit closely within the opening 2, with just enough clearance between the peripheral edge of the insert and the edge wall 4 to permit its ready accommodation. The insert 10 rests on the ledge 5.

The insert 10 of this embodiment includes an elongated plate 20, a fixed clamp 30 and a latch member 40.

The plate 20 has a plane top surface 21. At the latch end, a finger admitting hole 22 extends through the plate 20, as does a passage 23. Between the finger hole 22 and the passage 23, the upper surface 21 is recessed to form a channel 24. In this illustrative example of insert, a saw blade accommodating slot 25 extends through the plate and parallel with the long axis of the plate, as shown in FIGURE 1.

In the illustrative insert shown, which is cast from aluminum, strengthening ribs 26 and rims 27, 28 and 29 are provided to give strength and rigidity. The rib 27 extends around the periphery of the plate, on its undersurface, and the rims 28 and 29 extend around the periphery of the finger hole 22 and passage 23 respectively, also on the underside of the plate.

In this embodiment, the fixed clamp 30 includes a tapped clamp boss 31 on which one end of a leaf spring 32 is mounted by means of a threaded stud 33. The leaf spring 32 is substantially parallel with the top surface of the plate 20, and is bent at its outer end to facilitate installation of the insert. As can be seen from FIGURES 1 and 2, in place, the leaf spring 32 underlies and bears against the flange 3.

At the other end of the plate, the latch 40 includes a dog leg clamping member 41 and a leaf spring 42. The dog leg clamping member has a finger lift tab 44, a pivot-stop section 45, and a clamp leg 46. In this embodiment, the finger lift tab 44 normally lies within the recess 24, so that the upper surface of the finger lift tab 44 does not extend above the plane of the top surface 21 of the plate 20. The free end of the finger lift tab 44 extends partway within the reach of the finger hole 22.

The pivot-stop section 45 extends through the passage 23. The pivot-stop section 45 includes a central connecting web 55 and two, oppositely directed wings 56, defining shoulders 57, which bear upon and pivot within seats in pivot bosses 58, one on either side of the passage 23, as shown especially in FIGURES 4 and 5.

The clamp leg 46 is connected to the web section 55 along a curved section 47, which normally provides a bearing surface for the leaf spring 42. The leaf spring 42 is mounted at one end, by means of a threaded stud 43, on a leaf spring boss 53, integral with the underside of the plate 20. In this embodiment, the free end of the leaf spring 42 extends away from the plane of the plate. This ensures that the clamp leg 46 is continuously biased toward the underside of the plate.

In operation, if the insert 10 is seated in the opening 2, it is only necessary, in order to demount the plate, to put one's finger in the finger hole 22, hook it on the end of the finger lift tab 44, and raise the finger lift tab 44 against the bias of the spring 42, and, concurrently raise the insert, as the clamp leg 46 clears the edge of the flange 3, against which it is normally biased by the spring 42. In mounting the plate, the finger lift tab 44 is pulled up, the fixed clamp is slid under the flange 3 at one end, the other end of the insert is dropped into place and the finger lift tab is released, to permit the spring 42 to snap the clamp leg 46 snugly against the undersurface of the flange 3, and position the finger lift tab 44 within the recess 24.

It can be seen that in place, the insert of this invention is continually biased into mounted position, which prevents accidental dislodgment. At the same time, it is extremely easy to mount and demount.

Numerous variations in the construction of the insert of this invention will occur to those skilled in the art in the light of the foregoing disclosure. For example, other fixed clamp means can be substituted for the fixed clamp 30, although the fixed clamp 30 has advantages of simplicity in manufacture, maintenance, and installation. Thus, for example, the edge 4 at that end might be undercut, and the rim 27 slanted outwardly downwardly, to form a common type of holding arrangement. The details of the latch itself may be modified, although, more than in the case of the clamp 30, the construction shown and described has numerous advantages. For example, a pivot ear might be struck out from the connecting web 55, to engage the underside of the rim 29 of the passage 23, but this would not provide as positive a pivot arrangement as the wing and pivot boss arrangement shown. It can also be seen that the shape and construction of the finger hole 22 can be varied. It can even consist of a cup-shaped hollow, especially if the plate 20 is made as thick, for example, as the ribs 28, provided always that the end of the finger lift tab 44 projects within its reach, and that it would be deep enough to permit lifting of the finger lift tab 44. The word "concavity" is used in the claims to indicate either a hole or a hollow. It can also be seen that the shape of the plate can and will be varied to fit various types of access openings.

Having thus described the invention, what is claimed and desired to be secured by Letters Patent is:

1. An insert for closing an access opening in a machine table top, comprising a plate having a clamp near one edge and, spaced therefrom near another edge, a latch comprising a dog leg clamping member having a finger lift tab exposed along the upper side of the plate, a pivot-stop section extending through a passage in the plate and a clamp leg beneath said plate, cooperating pivot means on said plate and pivot-stop section, and biasing means bearing on said dog leg clamp member and normally biasing the clamp leg toward the underside of said plate, said plate having a finger accommodating concavity in its top surface within a part of the reach of which the finger lift tab extends.

2. The insert of claim 1 wherein the said clamp at one edge of the plate is a leaf spring, mounted at one of its ends on and spaced from the underside of the plate and with its free end oriented toward the adjacent free edge of the plate.

3. The insert of claim 1 wherein the said plate is provided with a recess adapted to receive the finger lift tab, whereby the finger lift tab is mounted below the plane of the upper surface of the plate.

4. The insert of claim 1 wherein the biasing means is a spring bearing at one end against a fixed part of the underside of the plate and at its other end on the dog leg clamping member.

5. The insert of claim 1 wherein the plate is provided with pivot bosses on its undersurface lying on opposite sides of the pivot-stop receiving opening in the slot and the pivot-stop section of the dog leg clamping member is provided with wings defining pivot shoulders bearing against the said bosses.

6. The insert of claim 5 wherein the biasing means is a leaf spring, one end of which is mounted on the underside of the plate and the other of which bears against a curved bearing surface between and joining the clamp leg and the pivot stop section of the dog leg clamping member.

7. The insert of claim 6 wherein the leaf spring is mounted with its mounted end nearer the plate than is the bearing surface of the dog leg clamping means, so that the free end of the leaf spring tends away from the underside of the plate.

References Cited by the Examiner

UNITED STATES PATENTS

| | | | |
|---|---|---|---|
| 2,020,222 | 11/1935 | Tautz | 143—132 |
| 2,810,412 | 10/1957 | Roug | 143—132 |
| 3,208,781 | 9/1965 | Appleberry | 292—228 |

DONALD R. SCHRAN, *Primary Examiner.*